2 Sheets--Sheet 1.

M. C. MEIGS
Lens-Attachment for Gas-Burners.

No. 6,373. Reissued April 13, 1875.

Witnesses:
Samuel Bootes.
Lucius F. Randolph.

Inventor:
M. C. Meigs

THE GRAPHIC CO. PHOTO-LITH. 39 & 41 PARK PLACE, N.Y.

2 Sheets--Sheet 2.

M. C. MEIGS.

Lens-Attachment for Gas-Burners.

No. 6,373. Reissued April 13, 1875.

Witnesses:

Geo. K. Finckel

L. F. Randolph.

Inventor:

M. C. Meigs.

THE GRAPHIC CO. PHOTO-LITH. 39 & 41 PARK PLACE, N.Y.

UNITED STATES PATENT OFFICE.

MONTGOMERY C. MEIGS, OF WASHINGTON, DISTRICT OF COLUMBIA.

IMPROVEMENT IN LENS ATTACHMENTS FOR GAS-BURNERS.

Specification forming part of Letters Patent No. 159,199, dated January 26, 1875; reissue No. 6,373, dated April 13, 1875; application filed March 11, 1875.

*To all whom it may concern:*

Be it known that I, MONTGOMERY C. MEIGS, of Washington city, in the District of Columbia, have invented an Improved Dioptric Illuminating Apparatus, of which the following is a specification:

The object of my invention is to concentrate light upon an object at some distance from the illuminating agent, which object I attain by combining a light and a glass lens filled with some transparent liquid. The subject-matter claimed is hereinafter specified.

Figure 1:
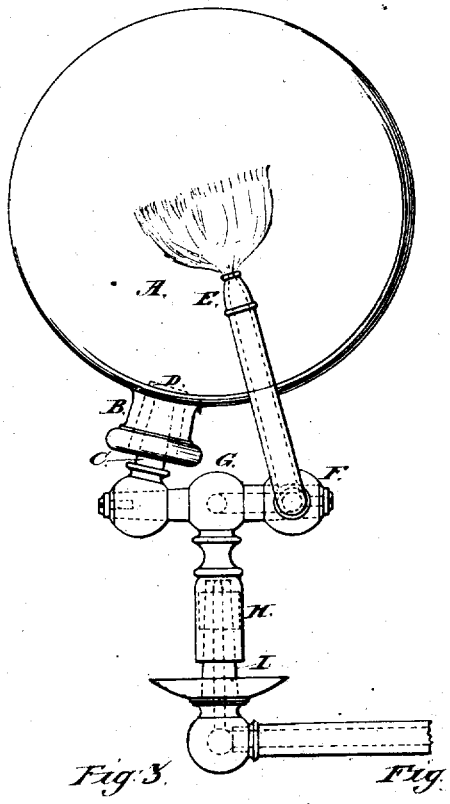
Figure 2:
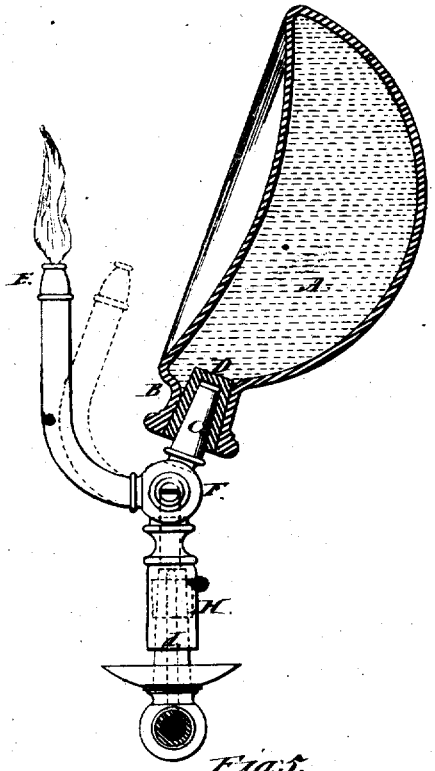
Figure 3:
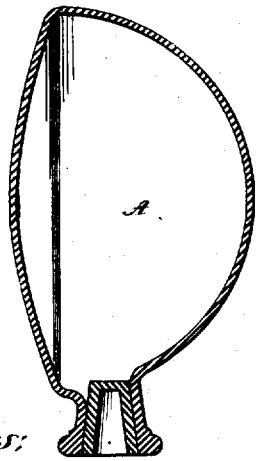
Figure 4:
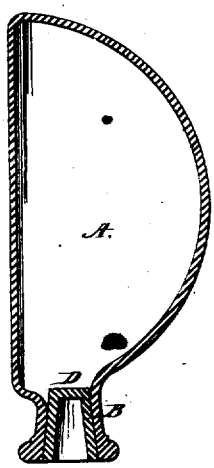
Figure 5:
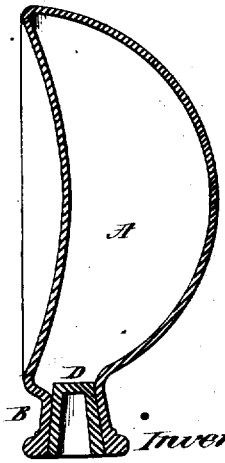

In the accompanying drawings, Figure 1 represents a view, in elevation, of one form of my improved apparatus, showing a spherical lens. Fig. 2 represents a side elevation of the apparatus, the lens (a concavo-convex one) being shown in section. Figs. 3, 4, and 5 show sections of lenses of various forms.

The lens A is shown as composed of a glass bottle provided with a neck, B, through which it may be filled with some transparent liquid, such as water or a solution of salts. A stem or plug, C, covered with cork D, or some other elastic substance, is inserted into, and tightly closes, this neck. For this covered plug a stem fitted by cement or by grinding may be substituted, acting, if ground, without packing. The stem acts both as a stopper and as a support. A gas-burner, E, is made adjustable in or near the principal focus of the compound lens A, being provided with an ordinary joint or coupling, F.

In order to adapt my apparatus to ordinary gas-fixtures, I construct a supplementary bracket, G, with a socket, H, to fit over the ordinary burner, and with a pivoted burner or swinging arm, E, through both of which, as well as through one end of the bracket G, a channel is formed to conduct gas to the burner. The stem C is provided with an eye, which fits upon the bracket G, the stem, or globe-support, and, consequently, the lens may be adjusted relatively to the light.

As the socket-piece H turns freely horizontally upon the burner, and as the lens and light are also adjustable around their pivots or points of support, it is obvious that the light may be thrown upon almost any desired spot. The apparatus may also readily be removed from one chandelier and applied to another.

When it is desired to fix the apparatus permanently in one place, a perforated stem fitting on the central boss of the bracket-piece, or any other suitable coupling which will allow the stem to turn on an axis at right angles to a line drawn through G F, Fig. 1, and having a screwed socket, may be substituted for the pivoted stem and turning socket-piece H above described.

Figure 6:
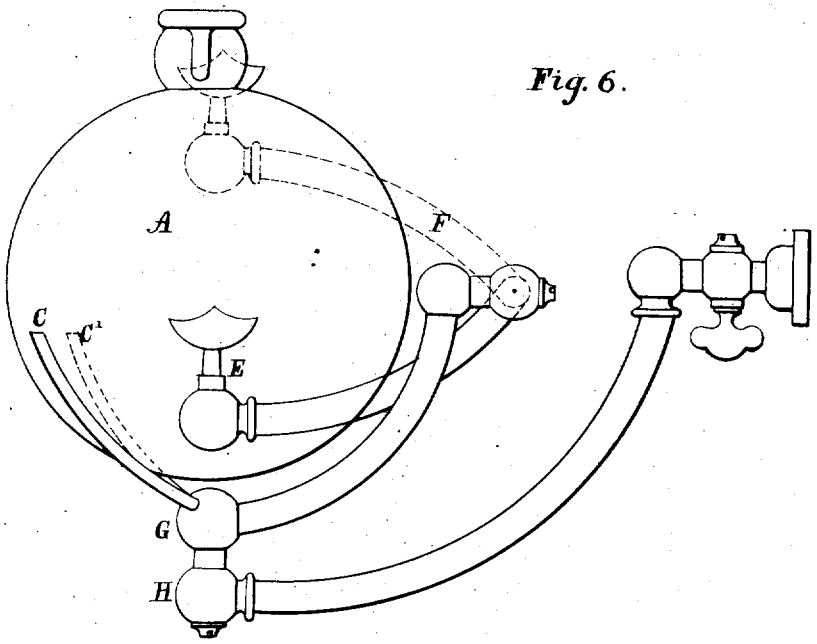
Figure 7:
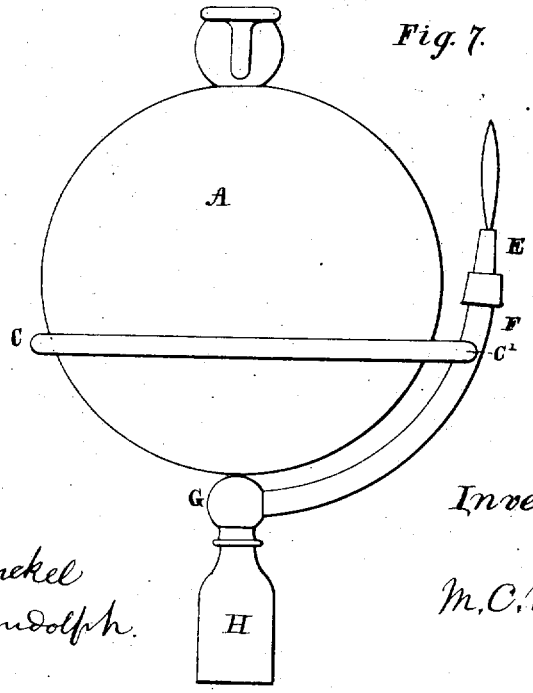

Fig. 6, A represents a spherical glass bottle filled with some transparent liquid, forming a compound dioptric lens. It is provided with a loose stopper or cover to prevent the entrance of insects or dust, which destroy the transparency of the contents, and to prevent the too rapid evaporation of the liquid, but to permit expansion thereof without bursting the glass. G is the bracket. G F is its principal arm. Both are hollow to allow the passage of the gas. H represents the coupling or joint by which the supplementary bracket is attached to a gas-branch or gas-pipe. For this joint H any usual gas-tight coupling allowing a revolution about its vertical axis may be used, such as a screwed socket and screwed plug with elastic packing, or a hollow socket ground or packed to fit gas-tight upon an ordinary gas-burner on the branch or gas pipe, or any other suitable coupling, of which many are well known. F is the joint by which the arm carrying the burner E is attached to the arm G F of the supplementary bracket. Its axis should be nearly at right angles to the axis of H. As the lens A and the burner E form parts of the apparatus, all supported by the supplementary bracket G, the whole can be turned about, revolving on the vertical axis of the joint at H, and thus the direction of the beam of light refracted by the lens can be changed or adjusted laterally. By the movement, in a vertical plane, of the burner E about the horizontal axis of the joint F the adjustment of the direction of the beam of light vertically can be made. For some situations the vertical adjustment is not necessary, and in such case the burner E, as is represented in Fig. 7, is screwed upon the end of the bracket-arm G F in place of the joint F, represented in Fig. 6. G C and G C′ in Fig. 6 represent arms, which, with the principal arm G F, retain and support the compound lens with its center of gravity vertically over the boss G of the supplementary bracket. C C′ in Fig. 7 represent a ring which is attached to the arm G F of the supplementary bracket, and supports the compound lens with its center of gravity also over the boss G of the supplementary bracket.

For use in general, the lens should be about six inches in diameter, and its radiuses of curvature may be varied at will. For large rooms, the size of the lens advantageously may be increased.

One such lens, possessing the capacity for adjustment of this apparatus, if placed upon a bracket or candelabrum on the side wall of a room, or on the gallery-rail of a church or hall, could readily be adjusted to cast its beam of light upon the reading-desk of the preacher or lecturer, and thus enable him to dispense with lights about the desk, or with chandeliers above or in front of him, which are so fatiguing to the eyes of an audience. The light may also be so arranged in the ceiling as to throw its rays vertically downward, or nearly so.

Several such lights and lenses may be mounted upon brackets and chandeliers, and so adjusted as to concentrate their rays of light upon any book, map, picture, diagram or piece of apparatus on the walls, desks, or tables which it may be desired strongly to illuminate.

I claim as my invention—

1. The combination of a supplementary bracket, adapted to be mounted on an ordinary gas-burner, gas-branch, or gas-pipe, a glass lens-shaped bottle mounted on the supplementary bracket, and adapted to contain transparent liquid, and a burner also mounted on said bracket, these members being constructed and operating substantially as set forth.

2. The supplementary bracket, provided with a coupling adapted to fit on an ordinary gas-burner, gas-branch, or gas-pipe, a support for a dioptric lens, and a burner, adjustable both vertically and horizontally, combined, substantially as and for the purpose set forth.

M. C. MEIGS.

Witnesses:
GEO. K. FINCKEL,
L. F. RANDOLPH.